United States Patent
Choi et al.

(10) Patent No.: US 6,760,088 B2
(45) Date of Patent: Jul. 6, 2004

(54) FERROELECTRIC LIQUID CRYSTAL DISPLAY

(75) Inventors: Suk Won Choi, Kumi-shi (KR); Su Seok Choi, Hanam-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 205 days.

(21) Appl. No.: 09/893,556

(22) Filed: Jun. 29, 2001

(65) Prior Publication Data

US 2002/0085153 A1 Jul. 4, 2002

(30) Foreign Application Priority Data

Dec. 30, 2000 (KR) ..................................... P2000-87052

(51) Int. Cl.[7] .............................................. H01L 1/141

(52) U.S. Cl. ....................... 349/133; 349/133; 349/134; 349/135; 349/140; 349/123; 349/127; 349/128; 349/132

(58) Field of Search ................................ 349/133, 134, 349/135, 136, 140, 123, 127, 128, 132

(56) References Cited

U.S. PATENT DOCUMENTS

| | | | | |
|---|---|---|---|---|
| 5,408,347 A | * | 4/1995 | Murakami et al. | 359/77 |
| 5,793,459 A | * | 8/1998 | Toko | 349/128 |
| 5,824,377 A | * | 10/1998 | Pirwitz et al. | 428/1 |
| 5,831,705 A | * | 11/1998 | Kaneko et al. | 349/128 |
| 5,851,423 A | * | 12/1998 | Teng et al. | 252/299.1 |
| 5,919,606 A | * | 7/1999 | Kazlas et al. | 430/321 |
| 6,075,583 A | * | 6/2000 | Mason et al. | 349/183 |
| 6,078,375 A | * | 6/2000 | Matsumoto et al. | 349/123 |
| 6,094,252 A | * | 7/2000 | Itoh et al. | 349/180 |
| 6,103,862 A | * | 8/2000 | Noh | 528/332 |
| 6,211,939 B1 | * | 4/2001 | Satou et al. | 349/192 |
| 6,469,762 B1 | * | 10/2002 | Hong et al. | 349/123 |

* cited by examiner

*Primary Examiner*—Allan R. Wilson
*Assistant Examiner*—Edgardo Ortiz
(74) *Attorney, Agent, or Firm*—McKenna Long & Aldridge LLP

(57) ABSTRACT

A ferroelectric liquid crystal display having alignment films with different surface polarities. The alignment films induce an internal electric field through the liquid crystal. Because of the induced internal electric field, initial liquid crystal alignment, and subsequent liquid crystal alignments, can be performed without an externally applied electric field.

11 Claims, 5 Drawing Sheets

FERROELECTRIC LIQUID CRYSTAL DISPLAY

CROSS REFERENCE

This application claims the benefit of Korean Patent Application No. P2000-87052, filed Dec. 30, 2000, under 35 U.S.C. §119, the entirety of which is hereby incorporated by reference.

BACKGROUND OF THE INVENTION

1. Field of the Invention

This invention relates to a liquid crystal display, and more particularly to a ferroelectric liquid crystal display having improved liquid crystal alignment films.

2. Description of the Related Art

A liquid crystal display (LCD) controls the light characteristics of a screen to display a desired image. Liquid crystals used in LCDs are in a neutral state between a liquid and a solid. That neutral state has both fluidity and elasticity.

While there are many types of liquid crystals, one type of great interest is the smectic C liquid crystal. During a thermodynamic phase transition, a smectic C liquid crystal rotates along an outer line of a virtual cone. Such a smectic C phase liquid crystal can undergo a spontaneous polarization. Such a liquid crystal is usually referred to as a "ferroelectric liquid crystal" (FLC). The FLC has been actively studied because of its fast response time. Furthermore, FLC LCDs can have wide viewing angles without the complications of special electrode structures or compensating films.

There are many different FLC modes, including a deformed helix FLC, a surface stabilized FLC, an anti-FLC, a V-mode FLC and a half V-mode FLC. Hereinafter, the V-mode FLC mode and the half V-mode FLC mode will be described in more detail.

FIG. 1 illustrates a liquid crystal cell having a V-mode FLC. As shown, that liquid crystal cell includes an upper substrate 1 having a common electrode 3 and an alignment film 5. That liquid crystal cell also includes a lower substrate 11 having a TFT array 9, which includes pixel electrodes, and an alignment film 7. A V-mode liquid crystal 13 is interposed between the upper and lower substrates 1 and 11. The alignment films 5 and 7 are aligned in a horizontal direction, usually by rubbing with a special cloth roller. The V-mode liquid crystal 13 forms multiple smectic layers that have molecular structures arranged with desired slopes with respect to a plane perpendicular to the smectic layers. In other words, the liquid crystal molecules have desired inclination angles with respect to the alignment directions of the alignment films. Furthermore, adjacent smectic layers have opposite polarities.

Light transmission through the V-mode FLC liquid crystal cell varies according to an applied voltage across that cell, reference FIG. 2. The liquid crystal 13 within the V-mode FLC liquid crystal cell responds to both positive and negative voltages. Since light transmissivity rapidly changes in accord with applied positive and negative voltages, the light transmissivity verses voltage curve has a V-shape as shown in FIG. 2. Thus, light transmissivity increases regardless of polarity.

FIG. 3 illustrates a liquid crystal cell having a half V-mode FLC. As shown, a half V-mode FLC liquid crystal 15 is interposed between an upper substrate 1 and a lower substrate 11. The half V-mode FLC liquid crystal 15 forms multiple smectic layers in which the liquid crystal molecules align at a desired inclination angle with respect to the alignment direction of the alignment films 5 and 7. However, as shown in FIG. 3, the liquid crystal molecules in adjacent smectic layers have the same polarity (unlike V-mode FLC liquid crystal molecules). Such a half V-mode FLC liquid crystal can be formed by applying a positive (or a negative) electric field to a hot liquid crystal while slowly lowering that liquid crystal's temperature into a smectic phase.

A half V-mode FLC mode liquid crystal 15 formed in this manner responds to only one polarity of applied voltage. Thus, as shown in FIG. 4, the light transmissivity verse voltage curve of a liquid crystal cell having the half V-mode FLC has a 'half V' shape. Still referring to FIG. 4, as shown, the light transmissivity verse voltage curve does react, slightly, to negative applied voltages, but dramatically to positive applied voltages.

The thermodynamic phase transition of a half V-mode FLC liquid crystal 15 is as follows:

Isotropic→nematic (N*) phase→smectic C* (Sm C*) phase→crystal

Such a thermodynamic phase transition expresses the phase of the liquid crystal in accordance with temperature, which becomes less as phase changes move to the right.

An isotropic phase liquid crystal 15 interposed into a liquid crystal cell aligns in parallel with the rubbing direction of the alignment layers when the liquid crystal temperature is slowly lowered to the nematic phase. If a sufficiently strong electric field is applied across the liquid crystal cell while the liquid crystal temperature is slowly lowered more, the liquid crystal 15 is phase-changed into a smectic phase in which the direction of spontaneous polarization of the liquid crystal molecules arranges according to the electric field in the cell. Consequently, when the liquid crystal 15 within the liquid crystal cell is subject to parallel alignment treated alignment layers, the liquid crystal molecules arrange in a spontaneous polarization direction that is consistent with the electric field at the phase transition, and in one of two possible molecular arrangements. As a result, the liquid crystal 15 has a uniform alignment state.

FIG. 5 and FIG. 6 help illustrate this. First, as shown in FIG. 5, if a negative electric field E(−) is applied during alignment of the liquid crystal 15, then the spontaneous polarization direction of the liquid crystal 15 is along the electric field. In such an aligned liquid crystal cell, as shown in FIG. 6, the liquid crystal arrangement is changed by an applied positive electric field E(+), but not by an applied negative electric field E(−).

To utilize the response characteristics of the liquid crystal 15, perpendicular polarizers are arranged on the upper and lower portions of the liquid crystal cell. The transmission axis of one of the polarizers is along the direction of the initial liquid crystal alignment. Assuming a liquid crystal cell having the transmission curve of FIG. 4, an applied negative electric field E(−) does not change the liquid crystal arrangement and the perpendicular polarizer blocks light. A positive electric field E(+) rotates the liquid crystal alignment such that light transmission increases.

FIG. 7 shows an electric field applied across a half V-mode FLC liquid crystal cell. As shown, the half V-mode FLC liquid crystal cell includes an upper substrate 1 with a common electrode 3 and an alignment film 5, a lower substrate 11 with a TFT array 9 and an alignment film 7, and a liquid crystal 15 interposed between the upper and lower substrates 1 and 11. The alignment films 5 and 7 are beneficially comprised of the same material and are subject to the same alignment treatment. An internal electric field, E-intra, which is contrary to the externally applied electric field, E-ext, depends on the alignment film material and on the polarization of the liquid crystal 15. This internal electric field E-intra is an induced polarization field.

As described above, the half V-mode FLC liquid crystal cell uses both temperature and an electric field to obtain the initial liquid crystal alignment. However, liquid crystal cells made in this manner have a problem in that the initial liquid crystal alignment can be disturbed by external impacts, which almost inevitably occurs due to grinding of a shorting bar. Furthermore, simple heating of a conventional half V-mode FLC liquid crystal cell can disturb the liquid crystal alignment. To re-establish liquid crystal alignment, both temperature and electric field treatments are required, which is difficult to do without the shorting bar.

Therefore, a new ferroelectric liquid crystal display having a liquid crystal alignment that can be thermally re-established would be beneficial.

SUMMARY OF THE INVENTION

Accordingly, it is an object of the present invention to provide a ferroelectric liquid crystal display having a liquid crystal cell alignment that can be thermally recovered if disturbed, such as by external impacts.

To achieve these and other objects, a ferroelectric liquid crystal display according to the principles of the present invention includes driving electrodes on an upper substrate and on a lower substrates; alignment films having different surface polarities on the driving electrodes; and a ferroelectric liquid crystal interposed between the upper substrate and the lower substrate.

In such a ferroelectric liquid crystal display the alignment films can have different surface polarities produced by different material structures. Alternatively, if the alignment films have the same material structure, the different surface polarities can be produced by different thermal treatments or by different alignment treatments.

BRIEF DESCRIPTION OF THE DRAWINGS

These and other objects of the present invention will be apparent from the following detailed description with reference to the accompanying drawings, in which.

DETAILED DESCRIPTION OF THE ILLUSTRATED EMBODIMENT

Figure 1:
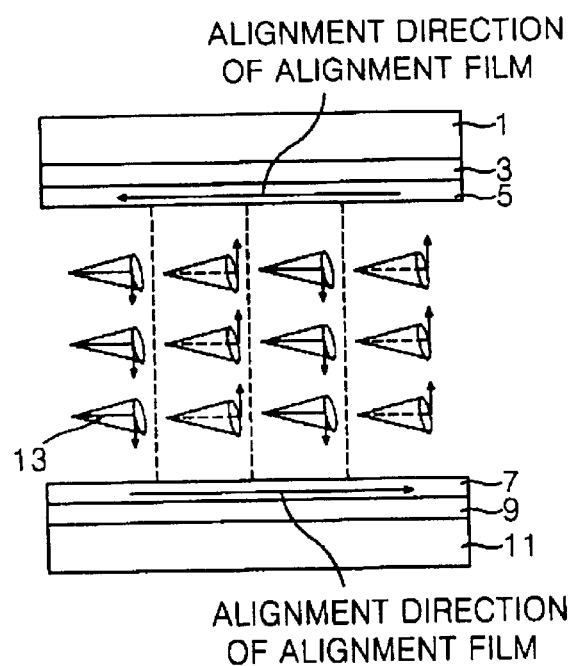
FIG. 1 illustrates a conventional V-mode FLC liquid crystal cell.
Figure 2:
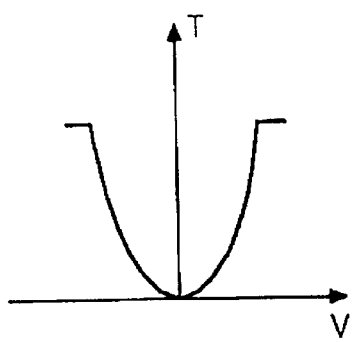
FIG. 2 is a graph representing light transmissivity verses voltage of the liquid crystal cell illustrated in FIG. 1.
Figure 3:
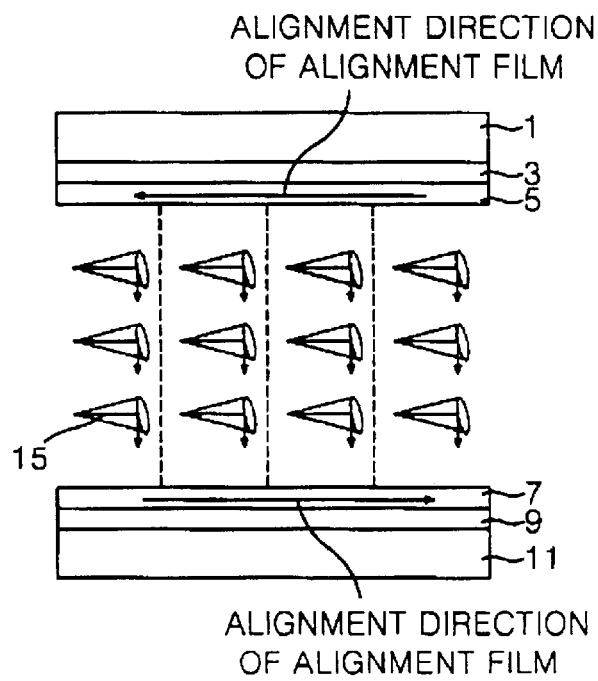
FIG. 3 illustrates a conventional half V-mode FLC liquid crystal cell.
Figure 4:
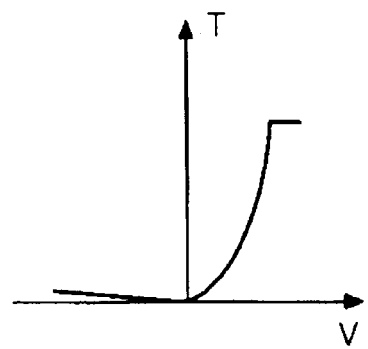
FIG. 4 is a graph representing light transmissivity verses voltage of the liquid crystal cell illustrated in FIG. 3.
Figure 5:
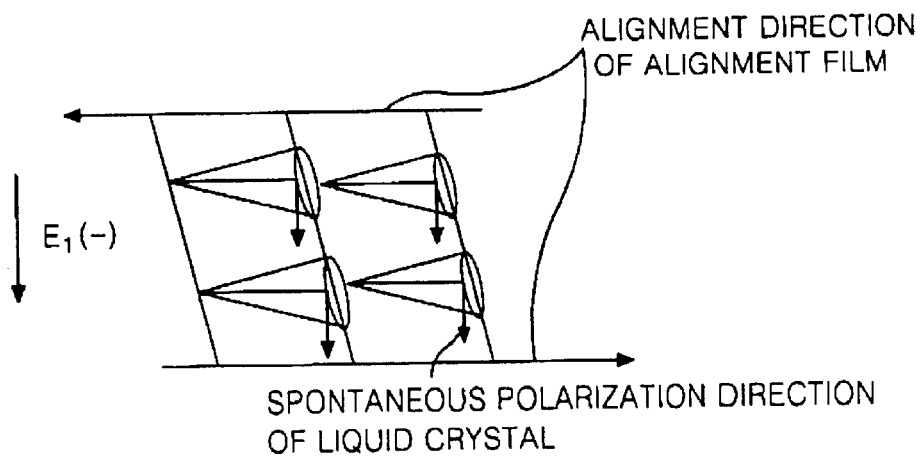
FIG. 5 illustrates an electric field applied to a conventional half V-mode FLC liquid crystal cell.
Figure 6:
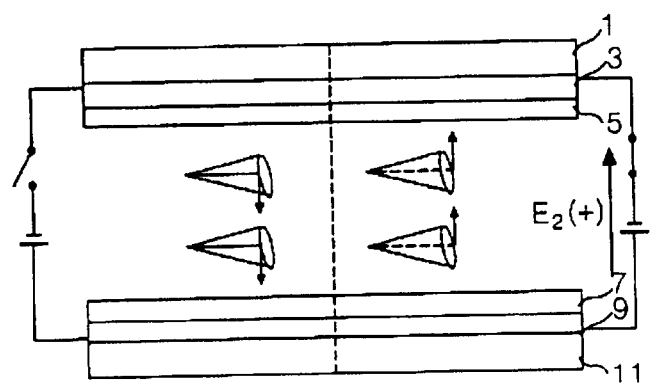
FIG. 6 depicts the motion of the liquid crystal upon application of a voltage to the half V-mode FLC liquid crystal cell of FIG. 5.
Figure 7:
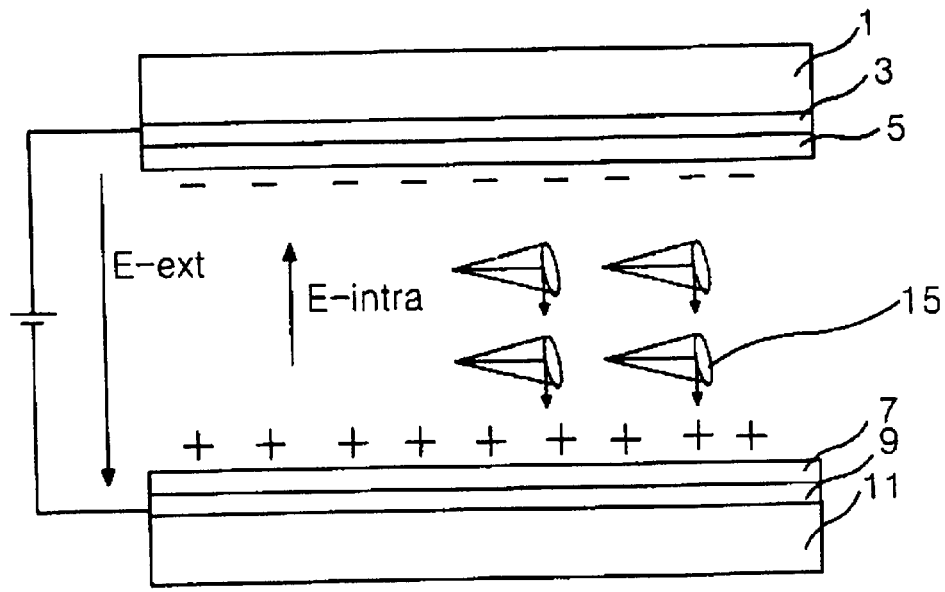
FIG. 7 is a schematic view of a conventional half V-mode FLC liquid crystal cell under an applied voltage.
Figure 8:
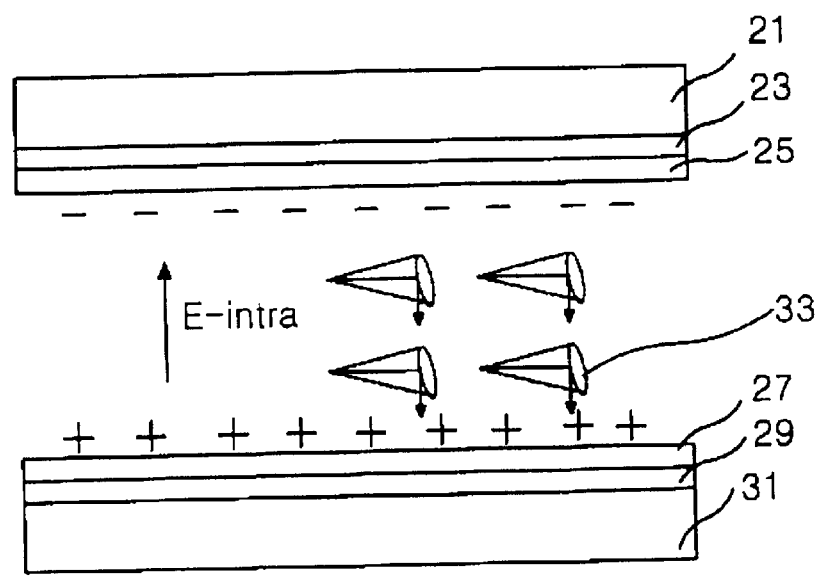
FIG. 8 is a schematic view of a half V-mode FLC liquid crystal cell that is in accord with the principles of the present invention.

Referring now to FIG. 8, a ferroelectric liquid crystal display (LCD) according to an embodiment of the present invention includes an upper substrate 21 having a common electrode 23 and an alignment film 25. That display further includes a lower substrate 31 having a TFT array 29 (including pixel electrodes) and an alignment film 27. A ferroelectric liquid crystal 33 is interposed between the upper substrate 21 and the lower substrate 31.

The alignment films 25 and 27 can be comprised of materials having different material structures or the same material structure. In either case the alignment films 25 and 27 are beneficially aligned by rubbing. Furthermore, the two alignment films 25 and 27 have different surface polarities. That is, the surface polarity of the upper substrate 21 is not the same as the surface polarity of the lower substrate 32. Thus, an internal electric field is induced by this surface polarity difference.

When interposed between the upper substrate 21 and the lower substrate 31, the ferroelectric liquid crystal 33 has an isotropic phase temperature. As the temperature of the ferroelectric liquid crystal 33 is slowly lowered to a nematic phase, the ferroelectric liquid crystal 33 aligns parallel to the rubbing direction. As the temperature is slowly lowered even more the ferroelectric liquid crystal 33 phase-changes into the smectic phase by the internal electric field across the liquid crystal cell. A spontaneous polarization direction of the ferroelectric liquid crystal 33 becomes consistent with the electric field at the interior of the liquid crystal cell. As a result, the ferroelectric liquid crystal 33 obtains a monostable alignment state.

To differentiate the surface polarities of the two alignment films 25 and 27, the alignment film materials can be comprised of polymers having different chemical structures. For example, in the case of polyimide, the dielectric constant and the polarization can be different in the alignment layers because the alignment film materials can have different side chain molecular substitution structures. The existence of such substitution structures is well known, reference, for example, Liquid Crystal, 1999, vol. 26, no. 2, 167–169. The contents of that paper are hereby incorporated by reference.

Alternatively, if the same alignment film materials are used, different temperature conditions or different rubbing conditions can cause the alignment films 25 and 27 to have different surface polarities. For example, different surface polarities can be applied to the alignment films by changing the intensity of the mechanical energy used when rubbing the alignment films. Reference, J.App.Phys. 83(3), Feb. 1, 1999. The contents of that paper are hereby incorporated by reference.

Since the alignment films 25 and 27 have different surface polarities, an internal electric field exists within the liquid crystal cell. As a result, an initial uniform liquid crystal alignment can be made using a temperature treatment. Thus, an external electric field is not required. Furthermore, if needed, a uniform liquid crystal alignment can be re-established using a temperature treatment without an external electric field being applied.

The following discussion provides a theoretical framework for aspects of the present invention. Further information can be found in Ferroelectrics, 1988, vol. 85, page 47. The contents of that paper are hereby incorporated by reference.

The surface polarity of an alignment film is related to an interfacial energy. More specifically, the interfacial energy corresponds to the energy sum of dispersive components and polar components, as expressed by the following equation:

$$\gamma = \gamma^p + \gamma^d \tag{1}$$

wherein γ represents an interfacial energy of a polymer used for the alignment film adjacent the liquid crystal; and $\gamma^p$ and $\gamma^d$ are a polar energy and a dispersive energy, respectively.

Since the polar energy is larger than the dispersive energy, the polar energy makes a large contribution to determining the polarity of the alignment film. As the interfacial energy of the alignment film polymer increases, the surface polarity of the alignment film increases. As the interfacial energy decreases, so does the surface polarity of the alignment film. Such a property can be used to differentiate the polarities of the alignment films on the upper and lower substrates. Thus, an internal electric field can be produced by the alignment films. Accordingly, the surface polarities of the alignment films can be differentiated by the cleaning or rubbing energies applied to the alignment films. Thus it is possible to implement alignment films having different polarities.

Figure 9:
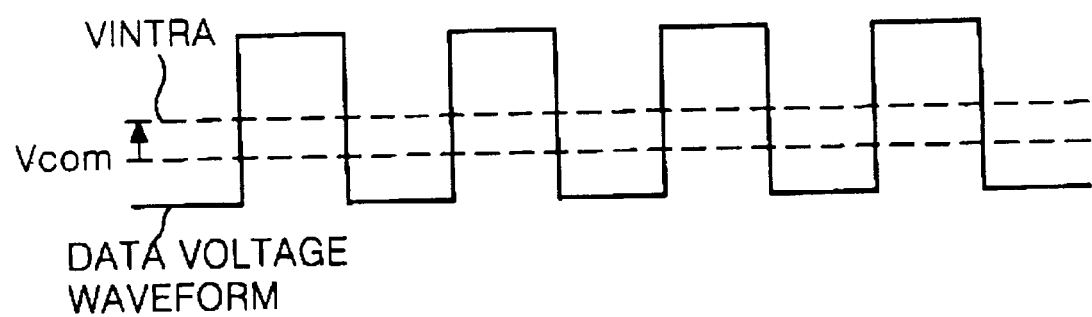
FIG. 9 is a waveform diagram of a driving voltage for the half V-mode FLC liquid crystal cell shown in FIG. 8.

FIG. 9 illustrates a driving voltage for a half V-mode FLC liquid crystal cell that is in accord with the principles of the present invention. As the half V-mode FLC liquid crystal cell has an internal electric field, the driving voltage is beneficially asymmetrical. Accordingly, a common voltage Vcom compensates for the internal electric field of the liquid crystal cell. For example, if the actual saturation voltage of the liquid crystal cell is approximately 3.3V, the voltage required for initial uniform alignment should be less than 3.3V.

The present half V-mode FLC liquid crystal cell produces an internal electric field due to surface polarity differences of the alignment film. That internal electric field enables re-establishment of a liquid crystal alignment, which can be disturbed by aging, temperature, or external impact, using only a thermal (heat) treatment.

As described above, according to the present invention, alignment films having different polarities are used to produce an internal electric field. Accordingly, it becomes possible to establish an initial liquid crystal alignment without the application of an external electric field, as well as to correct the liquid crystal alignments disturbed or broken by external impacts.

Although the present invention has been explained with reference to an illustrated embodiment, it would be understood by ordinary skilled persons in the art of the invention that the present invention is not limited to that embodiment. Rather, various changes or modifications of the present invention are possible without departing from the spirit of the invention. Accordingly, the scope of the invention shall be determined only by the appended claims and their equivalents.

What is claimed is:

1. A ferroelectric liquid crystal display, comprising:
   an upper substrate having a first alignment film with a first surface polarity;
   a lower substrate having a second alignment film with a second surface polarity, wherein said second surface polarity is different from said first surface polarity; and
   a ferroelectric liquid crystal interposed between the upper substrate and the lower substrate,
   wherein said first surface polarity and said second surface polarity induce an internal electric field across said ferroelectric liquid crystal and the internal electric field establishes an initial alignment of said ferroelectric liquid crystal.

2. The ferroelectric liquid crystal display according to claim 1, wherein said first alignment film and said second alignment film are alignment treated in parallel directions.

3. The ferroelectric liquid crystal display according to claim 2, wherein said ferroelectric liquid crystal is aligned in parallel to said alignment treatment direction of said first alignment film and said second alignment film.

4. The ferroelectric liquid crystal display according to claim 1, wherein said first alignment film and said second alignment film have different material structures.

5. The ferroelectric liquid crystal display according to claim 4, wherein said first alignment film and said second alignment film have different side chain molecular structures.

6. The ferroelectric liquid crystal display according to claim 5, wherein said first alignment film and said second alignment film are polyimides.

7. The ferroelectric liquid crystal display according to claim 1, wherein said first alignment film and said second alignment film have the same material structure.

8. The ferroelectric liquid crystal display according to claim 1, wherein said first alignment film and said second alignment film are polymers.

9. The ferroelectric liquid crystal display according to claim 1, wherein said first alignment film and said second alignment film have undergone different temperature treatments.

10. The ferroelectric liquid crystal display according to claim 9, wherein said first alignment film and said second alignment film have undergone different alignment treatments.

11. The ferroelectric liquid crystal display according to claim 1, wherein said ferroelectric liquid crystal display is driven by an external applied potential, and wherein said external applied potential compensates for said internal electric field.

* * * * *